J. P. STROOPE.
Bee-Hive.

No. 200,004.      Patented Feb. 5, 1878.

WITNESSES:
E. Wolff.
J. H. Scarborough.

INVENTOR:
J. P. Stroope,
BY Munn & Co
ATTORNEYS.

UNITED STATES PATENT OFFICE.

JACOB P. STROOPE, OF ARKADELPHIA, ARKANSAS.

IMPROVEMENT IN BEE-HIVES.

Specification forming part of Letters Patent No. 200,004, dated February 5, 1878; application filed November 12, 1877.

*To all whom it may concern:*

Figure 1:
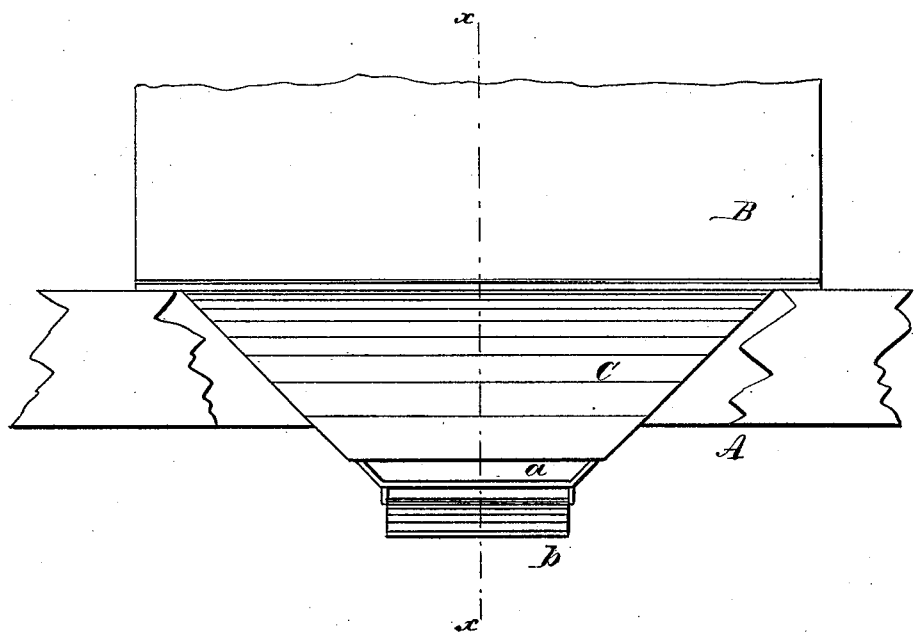
Figure 2:
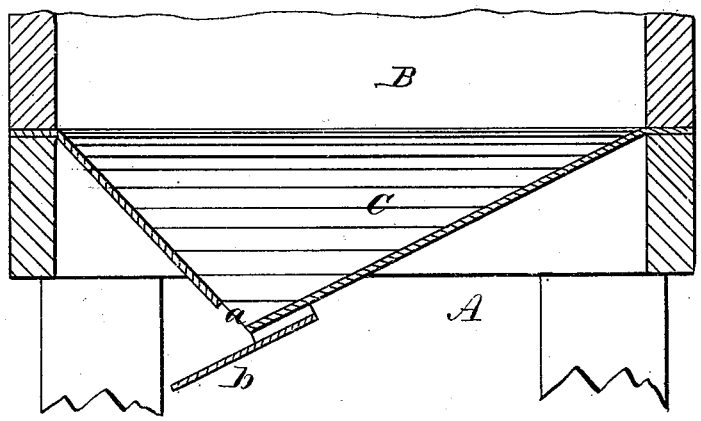

Be it known that I, JACOB PIRKEY STROOPE, of Arkadelphia, in the county of Clark and State of Arkansas, have invented a new and Improved Moth-Protector for Bee-Hives, of which the following is a specification:

Referring to the accompanying drawings, forming part of this specification, Figure 1 is a front elevation of a portion of a bee-hive having my improvement attached; and Fig. 2 is a vertical section taken on line $x$ $x$ in Fig. 1.

Similar letters of reference indicate corresponding parts.

The object of my invention is to provide a device for attachment to bee-hives for preventing the entrance of millers and facilitating the cleaning of the hive.

In the drawings, A is the frame which supports the hive, and B is a portion of an ordinary hive. C is a sheet-metal bottom placed upon the frame A and below the hive B. The bottom C is composed of sheet metal mitered or seamed together to give the bottom the form of a hopper.

An oblong aperture, $a$, is made in the bottom, and below it an inclined plate, $b$, is suspended. The space between the bottom and plate is of sufficient width to permit a miller to pass between the plate and the bottom B, while it is insufficient to admit of the passage of a bee. The aperture $a$ is of sufficient size to admit the bees to the hive. Both bees and millers may alight on the plate $b$. The miller follows the plate, and, being smaller than the bees, passes between the plate and the bottom C, while the bees, finding it impossible to enter the passage between the plate $b$ and bottom C, enter the hive through the aperture $a$.

The inclination of the bottom toward the aperture $a$ insures the discharge of all dust and refuse matter that would accumulate on a flat bottom, so that, should a miller enter the aperture $a$, no place is afforded for the deposit of eggs.

Having thus described my invention, I claim as new and desire to secure by Letters Patent—

The sheet-metal bottom C, having the aperture $a$, and provided with the plate $b$, suspended a short distance below it, substantially as and for the purpose herein shown and described.

JACOB PIRKEY STROOPE.

Witnesses:
   E. H. McDANIEL,
   J. T. HALL.